United States Patent [19]

Parker et al.

[11] Patent Number: 4,762,651
[45] Date of Patent: Aug. 9, 1988

[54] VAPOR/LIQUID CONTACT DEVICE

[75] Inventors: Byron M. Parker; Trent J. Parker, both of Salt Lake City, Utah

[73] Assignee: Uni-frac, Inc., Salt Lake City, Utah

[21] Appl. No.: 54,181

[22] Filed: May 26, 1987

[51] Int. Cl.$^4$ .............................................. B01F 3/04
[52] U.S. Cl. .............................. 261/114.1; 261/114.5
[58] Field of Search ........................ 261/114.1, 114.5

[56] References Cited

U.S. PATENT DOCUMENTS

| | | | |
|---|---|---|---|
| 1,811,247 | 6/1931 | Smith | 261/114.1 |
| 2,457,686 | 12/1948 | Kopita | 261/113 |
| 2,713,478 | 7/1955 | Ragatz | 261/114.1 |
| 2,737,377 | 3/1956 | Huggins et al. | 261/114.1 |
| 2,926,754 | 3/1960 | Ragatz | 261/114.1 |
| 3,062,517 | 11/1962 | Voetter et al. | 261/114.1 |
| 3,282,576 | 11/1966 | Bruckert et al. | 261/114.1 |
| 3,362,696 | 1/1968 | Vaughan | 261/114.1 |

FOREIGN PATENT DOCUMENTS

| | | | |
|---|---|---|---|
| 693413 | 7/1940 | Fed. Rep. of Germany | 261/114.1 |
| 817579 | 8/1959 | United Kingdom | 261/114.1 |
| 1101244 | 7/1984 | U.S.S.R. | 261/114.1 |

Primary Examiner—Tim Miles
Attorney, Agent, or Firm—Kenyon & Kenyon

[57] ABSTRACT

An effectively rectangular vapor/liquid contact tray, for utilization in fractionation columns, towers, and the like, for effecting distillation, fractionation, rectification, absorption, and refining of various liquid materials such as petroleum, chemical and alcohol solutions. Provisions are made in the contact tray to reduce the magnitude of vapor-pressure drop between successive contact chambers as well as to provide a positive and more effective vapor/liquid contact. This result is effected through the employment of a series of mutually spaced parallel baffles. They are arranged transverse to and submerged in fluid flow, this to take advantage of the advancing liquid's kinetic energy and resulting recirculation zones associated with the baffles and upstream from the outlet weir of the contact tray. Vapor admittance apertures are provided proximate the downstream surfaces of the baffles, through the contact tray, so as to assure positive vapor/liquid contact and to take advantage of low pressure conditions thereat.

2 Claims, 2 Drawing Sheets

VAPOR/LIQUID CONTACT DEVICE

FIELD OF INVENTION

The present invention relates to vapor/liquid contact trays useful in fractional distillation columns, by way of example, and, more particularly, to a new and improved contact tray which is more efficient than ones hitherto devised and which produces a pressure drop of less magnitude between contact chambers.

BRIEF DESCRIPTION OF PRIOR ART

The literature as relates to vapor/liquid contact trays, otherwise known as bubble plates, for fractionation and rectification columns, and so forth, is quite developed. However, no such literature is currently known to the inventors which is directly related to the subject invention as set forth herein and as claimed.

There are three major problems confronting the industry. One problem is that of maldistribution of liquid across a contact tray, outlined in some detail in Canadian Patent No. 949,444, issued June 18, 1974 and entitled LIQUID-GAS CONTACT TRAY (Matsch). A major cause of maldistributions, and hence uneven vapor/liquid contact results, is the varying cross-section of liquid across such contact tray. This varying cross-section causes an ineffective bubble area on the side or sides of the contact tray termed by some authors as "end wastage area." This phrase has been used by Professor Matthew Van Winkle of the University of Texas, Chemical Engineering Department, in his text entitled "Distillation", see page 574, published by McGraw-Hill, 1967. This is a continually occuring problem in round columns, and such problem can be eliminated by employing an effectively rectangular contact tray as is taught in the inventors' co-pending patent application, Ser. No. 840,134, filed Mar. 17, 1986 and entitled VAPOR/LIQUID CONTACT COLUMN STRUCTURE. This co-pending patent application also teaches the imperical reasons for employment of essentially rectangular vapor/liquid contact trays wherein fluid flow is uniform and unidirectional over the plate.

A second problem presently confronting the industry is the magnitude of the vapor-pressure drop across a contact tray; the greater the drop the greater the summation of pressure drops over the height of the column and hence the greater the energy requirement to force the vapors upwardly through the contact trays. The present invention substantially reduces vapor pressure drop across individual trays by means of employment of kinetic energy of fluid flowing over submerged baffles arranged mutually parallel and transverse to fluid flow, and which baffles, for contact trays, are not found in any of the literature to the present knowledge of the inventors.

A third problem of the industry is achieving effective uniform contact between the liquid and vapor at the tray. More contacts between liquid and vapor, where the heat transfer or mass transfer takes place, increases efficiency and reduces energy consumption. With the employment of submerged baffles or weirs, there is effected a greater contact of liquid and vapor which creates more heat transfer thereat and is more efficient. To the present knowledge of the inventors, there is no literature which teaches the injection of vapor proximate the downstream side of baffles, or the employment of submerged baffles in any event.

BRIEF DESCRIPTION OF PRESENT INVENTION

According to the present invention, an effectively rectangular vapor/liquid contact tray is provided. By "effective" is meant that either the tray itself is structurally rectangular or it is "effectively" rectangular in the sense that upstanding and opposite baffle sides may have inner edges constraining the side boundaries of fluid-flow to mutually parallel condition. Thus, as fluid flows from one end of the tray to the opposite end, such liquid flow will have uniform cross-section and velocity. Accordingly, pressure gradients transverse to the direction of fluid flow are eliminated. Accordingly, fluid flow proceeds at a uniform rate across the tray, from its inlet end to the outlet weir of the tray. Between the opposite ends of the tray are mutually spaced parallel baffles that are disposed transverse to the direction of fluid flow and which will be submerged relative thereto. A series of apertures for ascending vapors will be provided in the tray proximate the downstream sides of the respective baffles. The baffles themselves are preferably advantageously mutually spaced in the manner as hereinafter described, such spacing preferably equalling of the order of 5.5 times the baffle height. The liquid/vapor contact holes or apertures are in a restricted area preferably equal to one-half or less of the inter-baffle spacing. The purpose for such aperture positionment is to take advantage of the low-pressure areas immediately at the downstream sides of the baffles, so as to effect positive vapor/liquid contact at each baffle and to reduce pressure-drop across the plate. The present invention has application to petroleum, fractionation, alcohol distillation, and rectification, absorption, and indeed, whenever resort is to be had for separating or combining liquids and semi-liquid materials. It is further to be noted that the invention can be applied, by way of retrofitting, to existing colums or for incorporation into new columns. Advantages are that operating efficiencies are increased and capital costs are reduced. Operating energy requirements are also reduced over prior contact-tray designs.

OBJECTS

Accordingly, a principal object of the present invention is to provide a new and improved vapor/liquid contact tray.

A further object is to provide a contact tray for a more energy and cost-efficient separation of various liquids, semi-liquids, and so forth, by means of providing positive vapor/liquid contact.

An additional object is to provide a contact tray with a pressure drop per tray less than that of present trays, this by employment submerged baffles in reflux fluid flow; the lower the pressure drop, the less energy is required for vapor advancement and the less energy is consumed in the separation process.

A further object is to provide a contact tray with an effectively uniform cross-section for reflux liquid flow, this to provent maldistribution of reflux liquid, and therefor making a uniform vapor/liquid contact along transverse dimensions for the entire tray, and thus further increase the efficiency of the separation process.

BRIEF DESCRIPTION OF THE DRAWINGS

The present invention may best be understood by reference to the following description, taken in connection with the accompanying drawings in which.

BRIEF DESCRIPTION OF PREFERRED EMBODIMENTS

Figure 1:
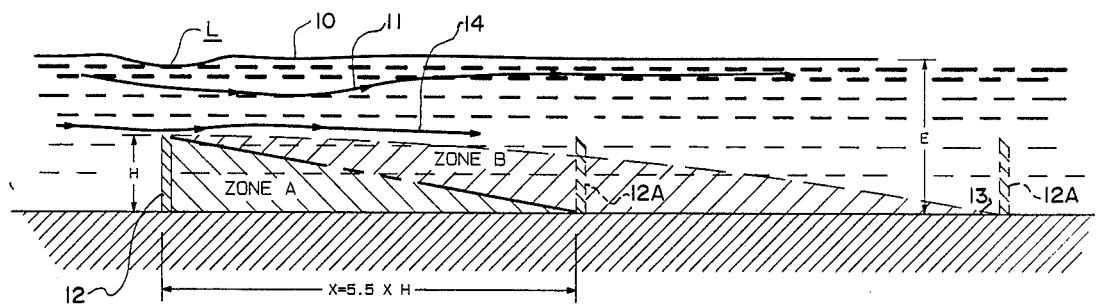
FIG. 1 is a longitudinal vertical section of an advancing fluid stream and constitutes a theoretical flow diagram relative to such stream; a submerged leaf gate or baffle is employed, and a second submerged baffle as illustrated in dotted lines for disposition proximate the termination of the low-pressure wedge or area in the stream pool posterior the downstream surface of the initial submerged baffle.

FIG. 1 is generalized depiction of fluid-flow and the pressure zones A and B resulting therefrom in the presence of a submerged leaf gate or baffle 12. Liquid comprising such fluid flow moves in the direction 10 and has flow stream lines 11 and 14 as illustrated. The submerged vertical baffle 12 is provided and is integral with and upstanding from bottom or base 13. Accordingly, flow lines 11 and 14 converge over the top of baffle 12 and then diverge back past such baffles, generally as indicated.

Owing to the presence of submerged baffle 12, pressure zone A will be generated in the shadow of the baffle, i.e., on the lee, or downstream side of the baffle, such zone A being a reduced pressure area of relatively constant reduced pressure for a given rate of fluid flow. Zone B will be more turbulent and exhibits varying but increased pressures along such zone. Reduced pressure zone A is believed to result from the Bernoulli effect, owing to the constrictive presence of the upper edge of baffle 12, and also by virtue of recirculating vertical eddy currents that proceed back to the lee side of the baffle in the zone A region. Dynamics of such fluid flow and resultant pressure zones created are more fully described in the November 1968 edition of the Journal of the Hydraulics Division, Proceedings of American Society of Civil Engineers, pages 1383 through 1397. Relative to the reduced pressure zone A, standard civil engineering texts which treat the flow in open channels, where sand dunes are disposed underneath a progressing stream or river, expound on the fact that on the lee side of any sand dunes in the stream or river bed, there will be reverse recirculation flows or vertically circulating eddy currents, oriented in a vertical plane, which operates to reduce the hydrostatic pressures at the lee side of such dunes.

The "Pressure Fluctuations in Reattaching Flow" article by Narrayanan & Reynolds in the above-referenced proceedings of American Society of Engineers publication, teaches that zone A will be wedge-shaped and will persist to a distance of the order of 5.5 times the height of the submerged baffle. It is proposed in the present invention to take advantage of this phenomenom by introducing a second submerged baffle at 12A shown in dotted lines in FIG. 1, this so that the reduced pressure zone A is found completely between the areas separating the two baffles 12 and 12A. Accordingly, the distance X, measured between the foward faces of the two baffles, in a preferred embodiment, will be approximately equal to 5.5 times the heights of both baffles being idential.

Second baffle 12A will likewise develop a "shadow" or a second reduced-pressure zone A at the lee side thereof, and so on for the succession of baffles utilized. The addition of subsequent baffles at the termination of low pressure zones A is believed totally new and is utilized in the present invention. Likewise completely new to the art is the adoption of the principle of FIG. 1 in contact trays for distillation columns, and with the provision of vapor ascent apertures proximate the lee side of the several submerged baffles to take advantage of low-pressure conditions thereat for effectively increasing vapor/liquid contact, froth produced, and heat exchange resulting therefrom. Again, as the Narrayanan & Reynolds article teaches: that zone A is in fact a wedge-shaped region of weak recirculation in a region of nearly uniform low pressure, certainly much lower than the upstream pressure.

Zone B on the other hand, will proceed to a distance of approximately 15½ times the height of the submerged baffle; this latter region is a region of very active recirculation, and pressure therein varies from the low pressure in zone A up to normal stream pressure. Reduction in plate pressure drop can be achieved by reductions of the height of outlet weir 22 from H1 to H2, this such that fluid flow proceeds directly and slightly over the tops of the various weirs. In any event, the areas at 27 will be essentially quiescent, allowing for gradual recirculation of eddy current fluid flow, 28, to the apertured area to the left of respective areas 27.

Figure 2:
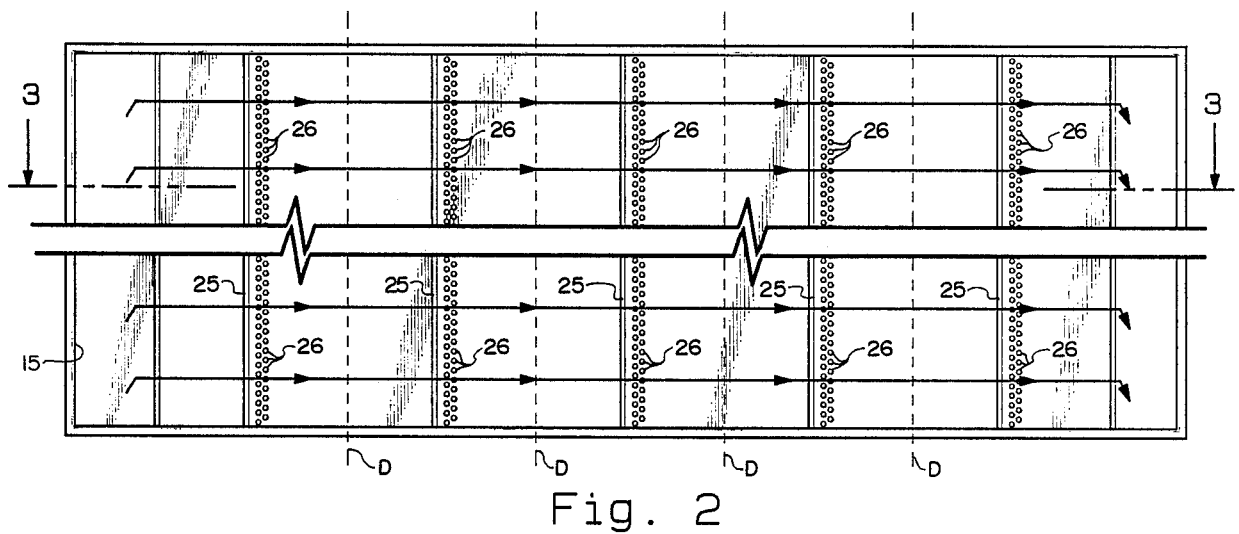
FIG. 2 is a plan view of a column section incorporating a downcomer, an outlet weir, and a representative vapor/liquid contact tray of the present invention between the two and over which reflux liquid uniformly flows.
Figure 3:
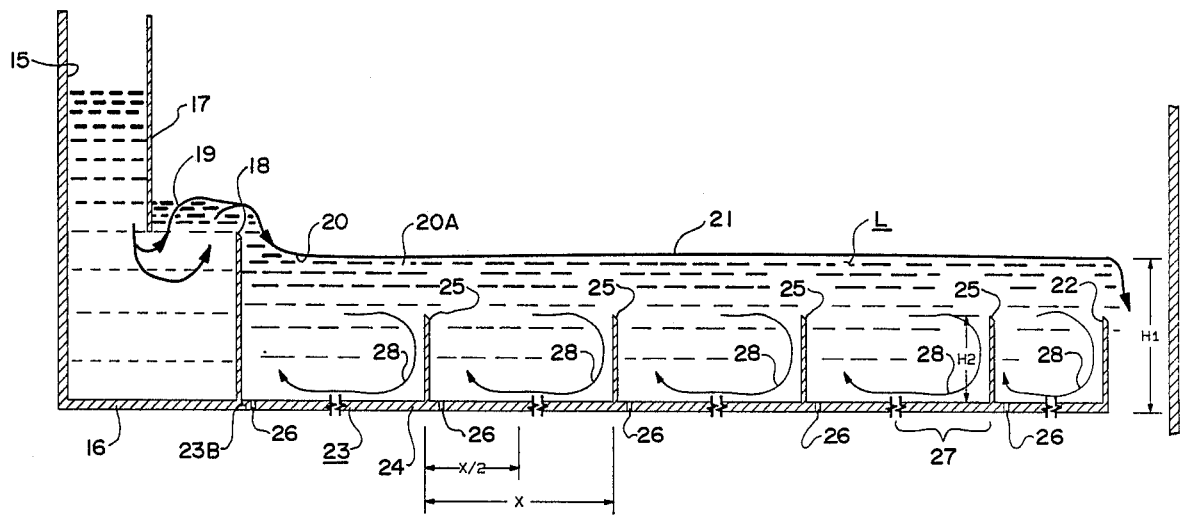
FIG. 3 is a vertical cross-section taken along the line 3—3 in FIG. 2, illustrating fluid-flow and recirculation or eddy streams in the reflux pool; for ease of illustration, inter-baffle spacing is shown reduced from that preferably actually practiced, as illustrated in FIG. 1.

In FIGS. 2 and 3 downcomer 15 includes partition 17 cooperating with inlet weir 18, upstanding from base 16, which forms throat 19. Submerged baffles 25 are preferably mutually spaced in accordance with the teachings and baffle spacing of FIG. 1; liquids L, having liquid level 21 as determined essentially by the outlet weir 22, flows in the directions indicated, including production of recirculating eddy currents 28. Apertures 26 in base 16 are preferably confined to areas of inter-baffle spacing between respective downstream baffle sides and midpoints of baffle spacing, this to effect vapor-admittance into the tray proximate the low pressure area, zone A, such that a quiescent zones 27 persists at each of the downstream half of inter-baffle spacings.

In operation as to FIGS. 2 and 3, reflux liquid descends the downcomer and rises at throat 19 to cascade over inlet weir 18 and advance in the direction of arrow 20, over the successive, submerged baffles 25, to proceed to and over outlet weir 22. The low-pressure areas proximate the eddy currents 28, at their upstream portions, maximizes efficiency of vapor/liquid contact above apertures 26.

Accordingly, what the present invention provides is a new and improved vapor/liquid contact tray for use in a variety of arts related to distillation, refining, fractionation, and so on.

Figure 4:
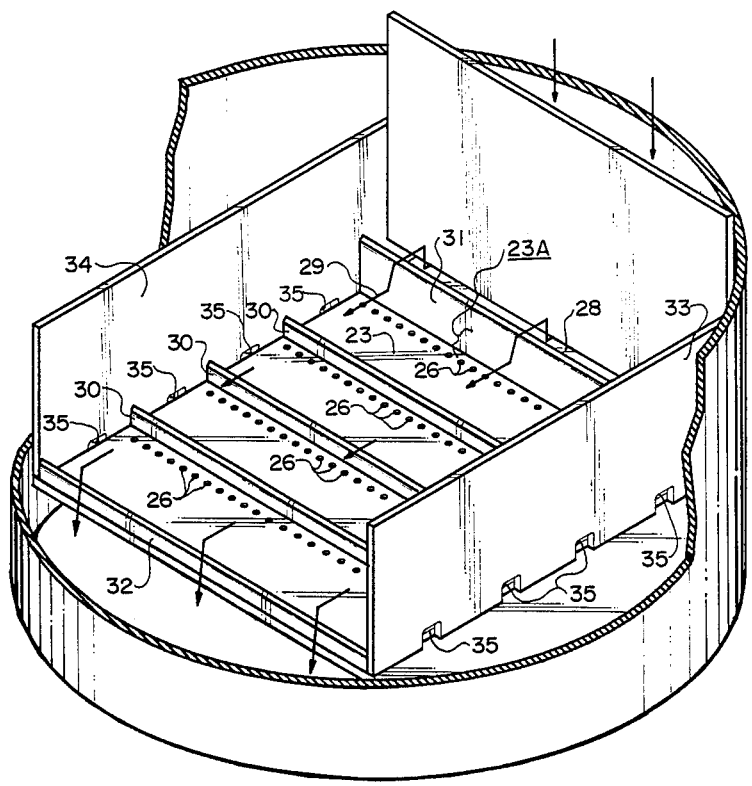
FIG. 4 is a fragmentary, isometric view of contact tray structure that can be employed in a retrofitting of a circular, alternate reflux flow distillation column.

FIG. 4 shows a vertical round column being retrofitted by contact tray 23A incorporating inlet and outlet weirs 31 and 32 and intermediate baffles 30. Side partitions 33 and 34 are provided, the same having apertures 35 to allow for the return of liquid that might accumulate owing to vapor decay and splashing that occur at the tray stage. Apertures 26 are, of course, the vapor/liquid contact ports for ascending vapors and these are shown restricted to areas approximate the lee sides of the various weirs and baffles.

Figure 5:
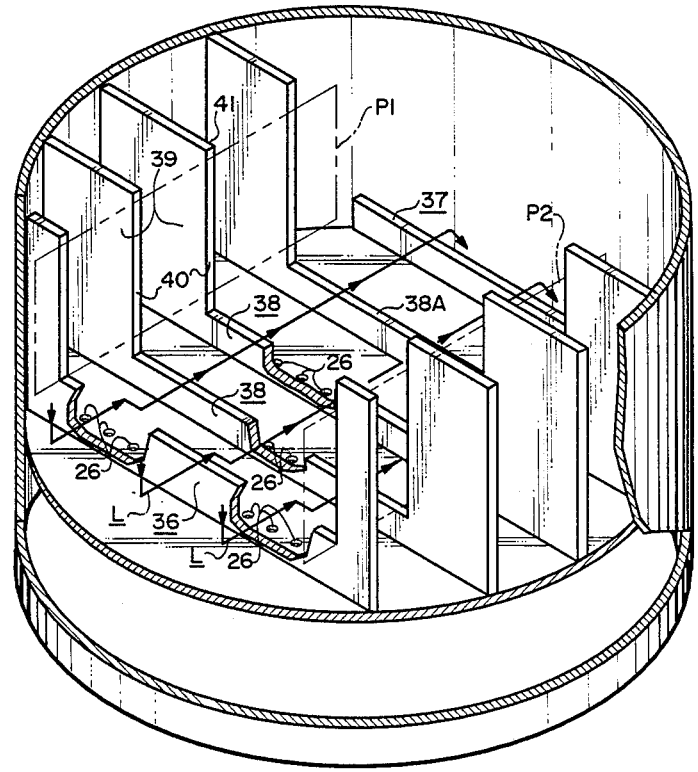
FIG. 5 is similar to FIG. 4 but illustrates alternative structure that can be used to retrofit a circular distillation column.

FIG. 5 illustrates a structure similar to FIG. 4, and which shows that the contact tray this time may include a series of weirs or baffles 38 having opposite individual sides 41 provided with edges 40 mutually coplanar in respective planes P1, P2. These latter edges define an essentially rectangular tray wherein fluid flow is unidirectional and uniform thereacross. Respective inlet and outlet weirs 36 and 37 are also provided. It will be observed that the central portions 38A of the baffles 38 will be in submerged condition similar to that seen in FIG. 3. The series of holes 26 will be provided proximate the anterior side or lee side of the individual baffle portions.

What is provided, therefore, is an effective rectangular tray, whether by virtue of the structure shown in FIG. 2 or the embodiments of FIG. 4 and FIG. 5, taken into consideration the coplanar constraining edges 40, wherein submerged baffles are employed to generate in vertical planes recirculating eddy currents to augment the Bernoulli effect of fluid-flow over the upper edges of the baffles and weirs, to create low pressure areas proximate the vapor/liquid holes or apertures; this is maximizing heat exchange, vapor/liquid mixing, and over-all plate efficiency while substantially lowering vapor-pressure drop per tray location.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

We claim:

1. In a transversely round distillation column having a cylindrical wall, a vapor/liquid contact tray having a base transverse with respect to and fitted against said column at the interior thereof, said tray having opposite ends respectively provided with inlet and outlet weirs, said base being provided with a series of parallel, transverse, mutually spaced baffles arranged parallel to said inlet and outlet weirs, said base being provided with perforate areas proximate the downstream sides of said baffles, said baffles including opposite upstanding sides contiguous with said column wall and having upstanding respective inner edges which are vertically co-planar, residing in side opposite parallel planes, whereby to provide parallel straight-sided flow of fluid from said inlet end to said outlet end.

2. In a transversely round distillation column having a cylindrical wall, a vapor/liquid contact tray having a base transverse with respect to and fitted against said column at the interior thereof, said base including opposite fluid inlet and outlet means and said tray being provided with a series of opposite upstanding baffle elements extending perpendicular to the base and including opposite respective outer edges contiguous with the cylindrical wall of said distillation column and upstanding respective inner edges which are vertically co-planar, residing in side opposite parallel planes, whereby to provide a parallel straight-sided flow of fluid from said inlet means to said outlet means thereby forming an effectively rectangular vapor-liquid contact tray.

* * * * *